US00RE48397E

(19) United States
(12) Reissued Patent
Kah, Jr.

(10) Patent Number: US RE48,397 E
(45) Date of Reissued Patent: Jan. 19, 2021

(54) BROKEN SPRINKLER FLOW RESTRICTION OR FLOW SHUT OFF SUPPRESSOR FOR SPRINKLER

(71) Applicant: Carl L. C. Kah, Jr., North Palm Beach, FL (US)

(72) Inventor: Carl L. C. Kah, Jr., North Palm Beach, FL (US)

(21) Appl. No.: 15/147,571

(22) Filed: May 5, 2016

Related U.S. Patent Documents

Reissue of:
(64) Patent No.: 9,254,502
Issued: Feb. 9, 2016
Appl. No.: 11/496,300
Filed: Jul. 31, 2006

U.S. Applications:
(60) Provisional application No. 60/703,683, filed on Jul. 29, 2005.

(51) Int. Cl.
*B05B 15/74* (2018.01)

(52) U.S. Cl.
CPC ..... *B05B 15/74* (2018.02)

(58) Field of Classification Search
CPC ..... B05B 15/10; B05B 15/74
See application file for complete search history.

(56) References Cited

U.S. PATENT DOCUMENTS 2,591,060 A * 4/1952 Garretson ..... 137/513.3
2,926,690 A * 3/1960 Martin ..... 137/460
5,293,898 A * 3/1994 Masloff ..... 137/517
5,465,752 A * 11/1995 Higgins ..... 137/512.5
5,673,855 A * 10/1997 Nguyen ..... B05B 15/10 239/241
5,676,315 A * 10/1997 Han ..... B05B 15/10 239/206
5,685,486 A * 11/1997 Spenser ..... B05B 3/0404 239/240
5,758,682 A * 6/1998 Cain ..... 137/68.14
5,996,905 A * 12/1999 Bedford ..... B05B 15/10 239/204
6,158,675 A * 12/2000 Ogi ..... B05B 1/046 239/396
6,263,911 B1 * 7/2001 Brown et al. ..... 137/519.5
(Continued)

*Primary Examiner* — Joseph A Kaufman
(74) *Attorney, Agent, or Firm* — Amster, Rothstein & Ebenstein LLP

(57) ABSTRACT

A restriction valve in accordance with an embodiment of the present invention includes a valve body adapted to be positioned at an inlet of the sprinkler, wherein the valve body includes a central opening through which water flows into the sprinkler, a rib extending downwardly from the valve body at a location beyond the margin of the central opening, a valve member configured to cooperate with the central opening to open and close the valve, wherein the valve member includes a valve stem extending downwardly from the valve member, and positioned and configured to be movably supported in a guide ring formed at a lower end of the rib, wherein the valve stem is movable vertically to move the valve member to its open and closed positions and a resilient member biasing the valve stem such that the valve member remains in an open position until water pressure pushing against the valve member reaches a predetermined level to move the valve member into the closed position to restrict the flow of water into the sprinkler

7 Claims, 3 Drawing Sheets

(56) References Cited

U.S. PATENT DOCUMENTS

| | | | | |
|---|---|---|---|---|
| 6,367,501 | B2 * | 4/2002 | Svehaug | 137/517 |
| 6,530,531 | B2 * | 3/2003 | Butler | 239/205 |
| 7,051,951 | B2 * | 5/2006 | Magi et al. | 239/201 |
| 7,318,556 | B2 * | 1/2008 | Lee et al. | 239/572 |
| 2003/0098365 | A1 * | 5/2003 | Lockwood | B05B 12/02 239/203 |
| 2005/0194464 | A1 * | 9/2005 | Bruninga | B05B 15/10 239/200 |

* cited by examiner

BROKEN SPRINKLER FLOW RESTRICTION OR FLOW SHUT OFF SUPPRESSOR FOR SPRINKLER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application claims benefit of and priority to U.S. Provisional Patent Application No. 60/703,683 entitled BROKEN SPRINKLER FLOW RESTRICTION OR FLOW STOP/FLOW SURGE SUPPRESSOR FOR SPRINKLERS filed Jul. 29, 2005, the entire contents of which are hereby incorporated by reference herein.

BACKGROUND OF THE INVENTION

The present invention relates to a restriction valve for use in a sprinkler of an irrigation system. More particularly, the present invention relates to a restriction valve that can be inserted into a sprinkler to restrict or shut off the flow of water into the sprinkler when desired.

DESCRIPTION OF THE ART

Irrigation systems typically include one or more sprinklers that are connected together via a common water supply pipe that provides water from a water supply to the sprinklers. The sprinkler are typically activated when a main valve is turned on, thus providing water from the water supply through the supply pipe to each of the sprinklers. It is common to use sprinklers with a pop-up riser that "pops up" when activated to allow for better dispersal of water and retracts when deactivated such that it does not present an obstacle on the lawn or landscape. Typically, the inflow of water into the sprinkler provides sufficient pressure to cause the riser to pop up as desired. Thus, it is generally favorable to avoid obstacles to the inflow of water into the sprinkler.

However, in certain circumstances, it may be useful to restrict or cut off the flow of water into a particular sprinkler. For example, in the irrigation system generally described above, a sprinkler that is positioned at the end of the supply line may have to absorb a rather high pressure inflow of water, particularly at start up. Due the rather substantial pressure change that occurs at start-up, the sudden impact of the high pressure water flowing into the sprinkler may damage parts within the sprinkler. Further, the sudden pressure increase will result in the riser rapidly popping up, which could also damage the sprinkler. In addition, if the riser is otherwise damaged, for example by a lawn mower or other landscape maintenance equipment, water provided to the sprinkler may simply pour out of the damaged riser. In this situation, it would be advantageous to cut off the high flow of water through the sprinkler.

While there are devices that are used to restrict the flow of water into a sprinkler, these devices tend to be complicated and thus, add both cost and complexity to the manufacture of sprinklers. For example, U.S. Pat. No. 5,823,440 assigned to Hunter Industries, Inc. relates to a velocity controlling valve. In this patent, the movement of a valve to allow the flow of water into the sprinkler is countered by resistance from dampening fluid in a chamber above the valve member, such that the valve opens slowly and restricts the rate of velocity of the flow of water into the sprinkler housing. While this solution may be effective, it is overly complicated and adds to the cost of the sprinkler and the complexity of its manufacture.

Thus, it would be beneficial to provide a restriction valve that avoids the problems noted above.

SUMMARY OF THE INVENTION

It is an object of the present invention to provide a restriction valve for use in a sprinkler that overcomes the problems discussed above.

A restriction valve for a sprinkler in accordance with an embodiment of the present application includes a valve body adapted to be positioned at an inlet of the sprinkler, wherein the valve body includes a central opening through which water flows into the sprinkler, rib extending downwardly from the valve body at a location beyond the margin of the central opening, a valve member configured to cooperate with the central opening to open and close the valve, wherein the valve member includes a valve stem extending downwardly from the valve member, and positioned and configured to be movably supported in a guide ring formed at a lower end of the rib, and wherein the valve stem is movable vertically to move the valve member to its open and closed positions, and wherein a resilient member biasing the valve stem such that the valve member remains in an open position until water pressure pushing against the valve member reached a predetermined level to move the valve member into the closed position to restrict the flow of water into the sprinkler.

A sprinkler for use in an irrigation system in accordance with an embodiment of the present application includes a body, a spring biased riser mounted in the body and operable to move upward and downward therein, an inlet formed in a bottom of the body for connection to a water supply and a restriction valve positioned in the inlet and operable to move between an open position in which water is supplied to the sprinkler and a closed position in which water is prevented from entering the sprinkler. The restriction valve may also include a resilient member which biases the restriction valve in the open position until a predetermined pressure is applied to the restriction valve to move it to the closed position and to restrict the flow of water in to the sprinkler body, the predetermined pressure selected based on a relative position of the sprinkler in the irrigation system.

Other features and advantages of the present invention will become apparent from the following description of the invention which refers to the accompanying drawings.

BRIEF DESCRIPTION OF THE DRAWING(S)

DETAILED DESCRIPTION OF PREFERRED EMBODIMENTS OF THE INVENTION

A flow control device in accordance with an embodiment of the present invention preferably includes a spring loaded restriction valve that may be pressed or screwed into the inlet of existing sprinkler housings. Alternatively, the restriction valve may be integrally molded into the body of the sprinkler during manufacture, if desired.

Figure 1:
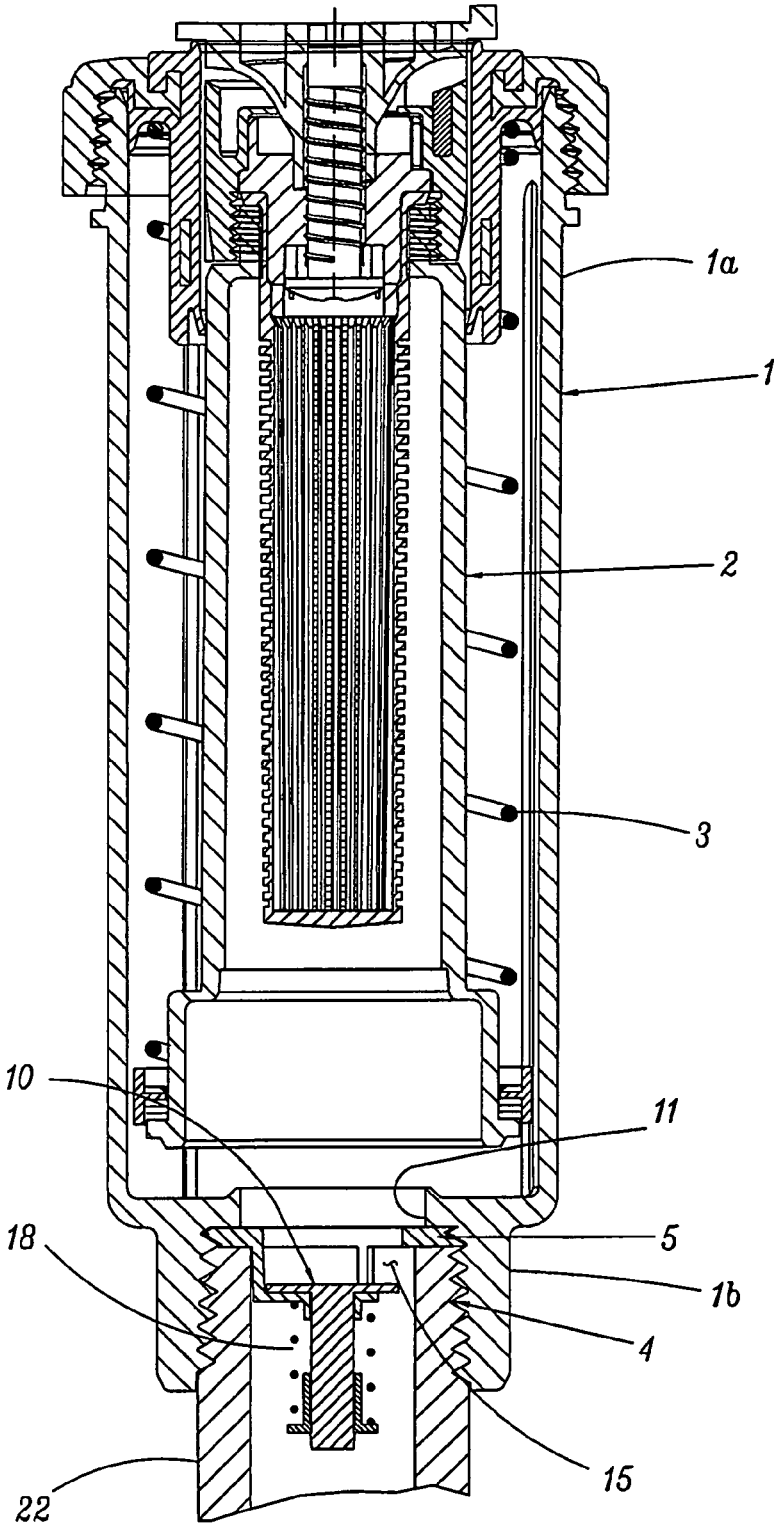
FIG. 1 is a cross sectional view of a pop up type adjustable arc sprinkler with a restriction valve in accordance with an embodiment of the present application.
Figure 2:
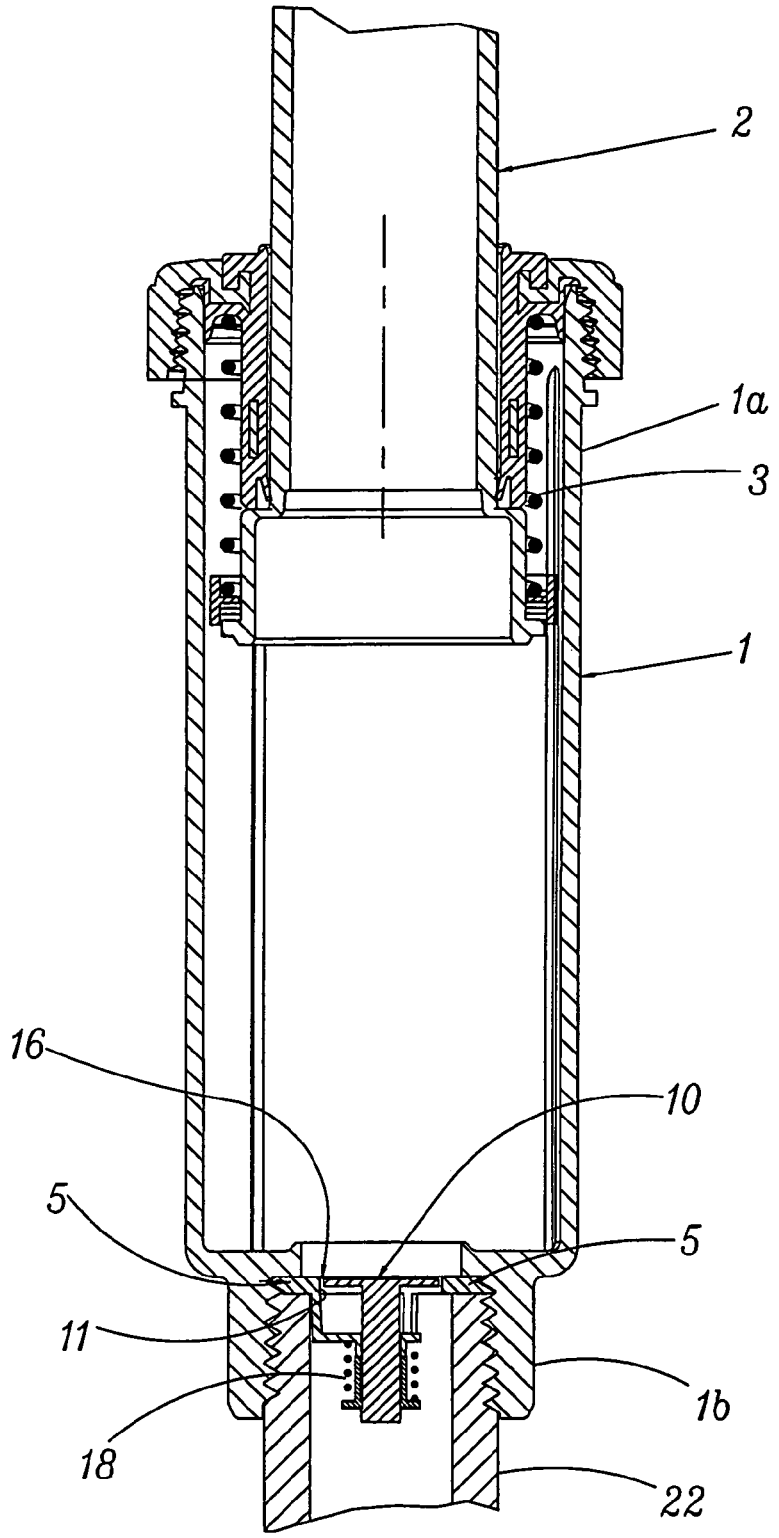
FIG. 2 illustrates a cross section of the sprinkler of FIG. 1 with the riser is a raised position.

Referring to FIG. 1, a pop-up gear driven type sprinkler 1 may include a spring loaded restriction valve 5 in accordance with the present invention. The restriction valve illustrated in FIG. 1 is a poppet valve, however any other pressure responsive valve may be used.

The restriction valve 5 may be inserted into the sprinkler body 1a at a threaded inlet portion 1b thereof before the inlet pipe 22 is screwed into the sprinkler body to supply water to the sprinkler. That is, the restriction valve 5 is preferably positioned in the threaded area 1b between the sprinkler body 1a and the inlet pipe 22.

Figure 3A:
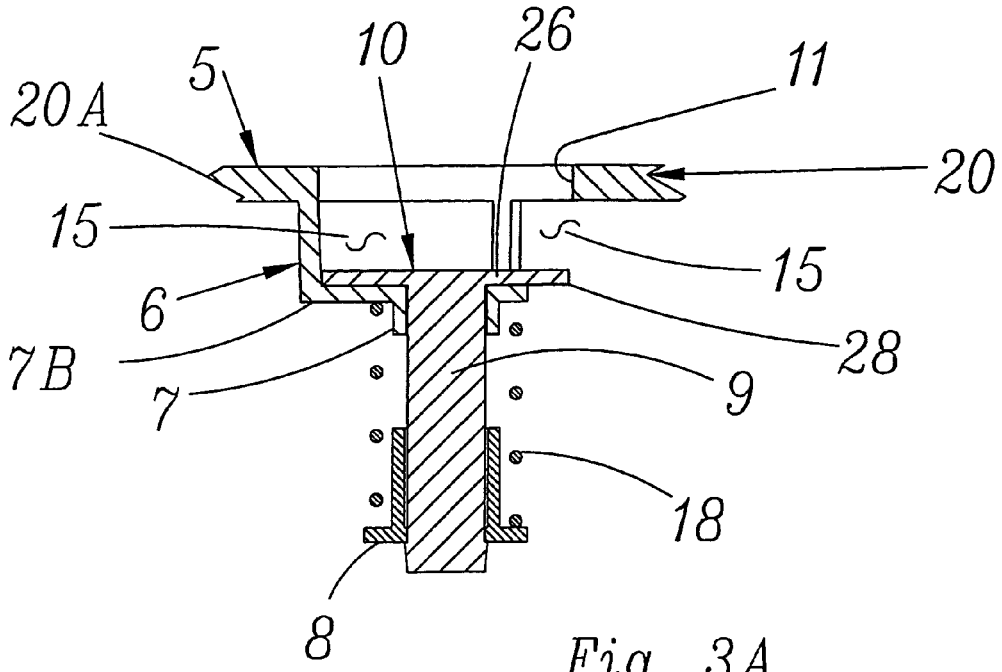
FIG. 3A is a cross section side view of a restriction valve in accordance with an embodiment of the present application.

As best seen in FIG. 3A in the illustrated embodiment, the restriction valve 5 preferably includes body portion 20, a valve member 10 and a spring 18. While a spring is specifically described in the present application, it is noted that spring 18 may be replaced by any resilient member. Similarly, while the present application illustrates helically wound spring 18, any other appropriate type of spring may be used, such as a leaf spring.

Figure 3B:
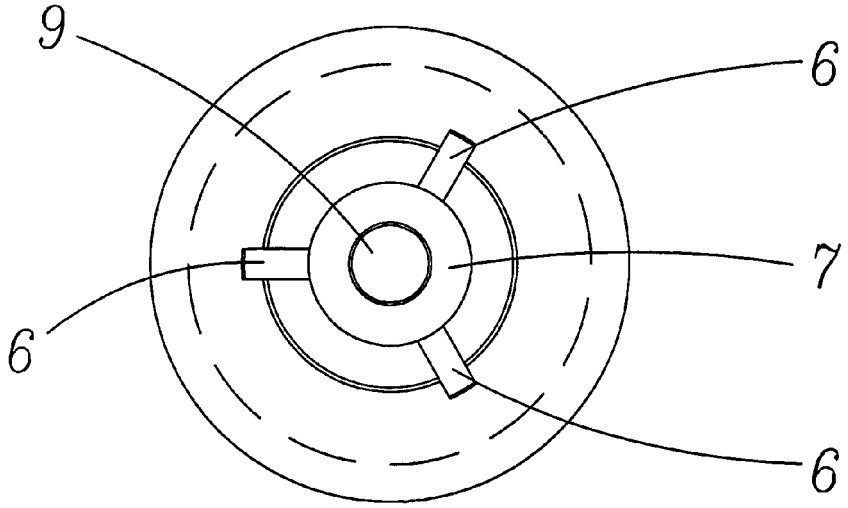
FIG. 3B is a bottom plan view of the restriction valve of FIG. 3

Valve body 20 is formed of an annular washer-like plate 20A with one or more downwardly extending ribs 6. The ribs 6 terminate at their lower ends in a guide ring 7. In a preferred embodiment, multiple ribs 6 extend downwardly from the valve body 20 to provide additional support for the guide ring 7 (see FIG. 3B, for example).

The valve member 10 includes a valve disk 26 and a downwardly extending valve stem 9 which is positioned in the guide ring 7. A peripheral surface 28 of the disk 26 cooperates with a valve seat formed by complimentary surface 11 on the radially inner margin of plate 20A to open and close the valve. The guide ring 7 guides the vertical movement of the valve stem 9.

The top of the spring 18 bears against the bottom surface 7B of the guide ring 7 (see FIG. 3A). The bottom of the spring 18 bears against the flange 8 formed on the bottom end of the valve stem 9 such that the spring biases the valve member 10 in an open position as illustrated in FIGS. 1 and 3A, for example. The downward force of the spring 18 against the flange 8 holds the disk away from the opening 11 in the body 20. As a result a space 15 is maintained between the disk 26 and the body 20 that allows water to flow through the valve 5 into the sprinkler body 1a.

The valve 5 remains open unless or until the force of the water flowing through the valve pushes the valve member 10 upward. Spring 18 is partially compressed on assembly and presses against the flange 8 to keep the valve open until the pressure exerted by the flow overcomes the bias of the spring 18 to push the valve member 10 upward into the closed position. This occurs when the pressure of the water flow reaches a predetermined pressure level sufficient to cause a differential pressure across the disk area 26 of valve member 10 to overcome the preload force of spring 18 to keep the valve member down and the flow area 15 between the opening 11 and the disk 26 open. As the valve member 10 moves upward into the closed position, the opening 15 is eliminated and the flow of water is cut off or restricted depending on the diameter fit between the outside circumference 28 of the disk 26 and the opening 11, as is described further below.

In an alternative embodiment, the disk 26 of the restriction valve 5 may be sized such that its diameter is smaller than that of the opening in the body 20. As a result, when the valve member 10 moves into the closed position, the disk 26 will not completely block the opening in the body 20. Thus, water will still be able to flow into the sprinkler body but at a reduced rate. After the pressure differential inside the sprinkler and at the inlet stabilizes, the valve member 10 will return to the open position. Thus, this embodiment is particularly useful for restricting the flow rate into the sprinkler to avoid damage.

The predetermined pressure at which the valve member is moved into the closed position preferably corresponds to a flow rate in the sprinkler that is likely to cause damage and/or indicate a damaged sprinkler, for example, approximately 5-6 gallons per minute (GPM). Naturally, the spring 18 may be selected such that the spring bias is overcome at any desired flow rate.

The restriction valve 5 may be color coded or otherwise marked to indicate the bias provided by the resilient member and to indicate whether the disk is wide enough to block off the flow of water completely, such that the valve can selected for use in an appropriate sprinkler. For example, in different irrigation systems, individual sprinklers may be subject to higher flow pressures due to their relative position in the system, for example. Similarly, certain sprinkler may be more prone to damage based on their position in the irrigation system. Other sprinklers in the system may not need restriction valves at all. Thus, it is particularly advantageous that the restriction valve 5 can be inserted into any desired sprinkler.

In an alternative embodiment, the restriction valve 5 may be incorporated directly into the body 1a of the sprinkler 1 during manufacture. In this case, the valve body 20 is preferably integrated into or attached to the body 1a of the sprinkler. Otherwise the operation of the valve is substantially similar to that described above. In this embodiment, the sprinkler may be color coded or otherwise marked to indicate the bias of the spring used therein and to indicate whether the disk is wide enough to shut off the water flow in order to allow sprinklers to be appropriately positioned in the irrigation system.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sprinkler for use in an irrigation system comprising:

a body;

a [spring biased] riser mounted in the body configured and operable to move upward and downward therein;

an inlet formed in a bottom of the body configured and operable for connection to a water supply; and a restriction valve positioned in the inlet and operable to move between an open position in which water is supplied to the sprinkler and a closed position in which the flow of water entering the sprinkler is restricted, the restriction valve further comprises:

a valve body integrated into the body of the sprinkler adjacent to the inlet and including a central opening through which water flows into the sprinkler;

a rib extending from the valve body along a longitudinal axis of the valve at a location beyond an inner margin of the central opening;

a valve member configured and operative to cooperate with the central opening to open and close the valve; and a resilient member which biases the restriction valve in the open position until a predetermined pressure is applied to the restriction valve to move it to the closed position and to restrict the flow of water [in to] *into* the sprinkler body, the predetermined pressure selected based on a relative position of the sprinkler in the irrigation system, wherein the valve member further includes a valve stem extending in a direction of a longitudinal axis of the valve from the valve member, and positioned and configured to be movably supported in a guide ring formed at a lower end of the rib, wherein the valve stem is movable vertically to move the valve member to its open and closed positions, the resilient member biasing the valve stem such that the valve member remains in the open position until water pressure pushing against the valve member reaches the predetermined pressure to overcome the bias of the resilient member, and further comprising a plurality of ribs extending from the valve body in a direction of a longitudinal axis of the valve, wherein the plurality of ribs support the guide ring.

*2. A sprinkler for use in an irrigation system comprising:*

*a cylindrical body;*

*a riser mounted in the body to move upward and downward therein;*

*an inlet formed in a bottom of the cylindrical body configured and operable for connection to a water supply; and*

*a restriction valve positioned in the inlet and operable to move between an open position in which water is supplied to the sprinkler and a closed position in which the flow of water entering the sprinkler is restricted, the restriction valve comprise:*

*a valve body integrated into the body of the sprinkler adjacent to the inlet and including a central opening through which water flows into the sprinkler;*

*a rib extending from the valve body along a longitudinal axis of the valve at a location beyond an inner margin of the central opening;*

*a valve member configured and operative to cooperate with the central opening to move between the open position and the closed position, the valve member further having a disk with a maximum diameter, the disk shaped to fit into the central opening in the valve body when the valve member is in the closed position, wherein the maximum diameter of the disk is less than that of the central opening such that the flow of water into the sprinkler is restricted; and*

*a resilient member which biases the restriction valve in the open position until a predetermined pressure is applied to the restriction valve to move it to the closed position and to restrict the flow of water into the sprinkler body, the predetermined pressure selected based on a relative position of the sprinkler in the irrigation system,*

*wherein the valve member further includes a valve stem extending downwardly from the valve member, and positioned and configured to be movably supported in a guide ring formed at a lower end of the rib, wherein the valve stem, is movable vertically to move the valve member to its open and closed positions; and*

*the resilient member biasing the valve stem such that the valve member remains in the open position until water pressure pushing against the valve member reaches the predetermined pressure to overcome the bias of the resilient member.*

*3. The sprinkler or claim 2, wherein the valve member further comprises:*

*a flange extending from the valve stem below the guide ring, wherein the resilient member is positioned between the flange and the guide ring to bias the valve member in the open position.*

*4. The sprinkler of claim 2, wherein the resilient member is tensioned to resist compression until the predetermined pressure is exceeded.*

*5. The sprinkler of claim 2, further comprising indicia identifying the predetermined pressure required to compress the resilient member.*

*6. A sprinkler for use in an irrigation system comprising:*

*a cylindrical body;*

*a riser mounted in the body to move upward and downward therein;*

*an inlet formed in a bottom of the cylindrical body configured and operable for connection to a water supply; and*

*a restriction valve positioned in the inlet and operable to move between an open position in which water is supplied to the sprinkler and a closed position in which the flow of water entering the sprinkler is restricted, the restriction valve comprise:*

*a valve body integrated into the body of the sprinkler adjacent to the inlet and including a central opening through which water flows into the sprinkler;*

*a rib extending from the valve body along a longitudinal axis of the valve at a location beyond an inner margin of the central opening;*

*a valve member configured and operative to cooperate with the central opening to open and close the valve;*

*an external thread positioned on an outer periphery of the valve body and configured and operable to screw the restriction valve into the sprinkler body; and*

*a resilient member which biases the restriction valve in the open position until a predetermined pressure is applied to the restriction valve to move it to the closed position and to restrict the flow of water into the sprinkler body, the predetermined pressure selected based on a relative position of the sprinkler in the irrigation system,*

*wherein the valve member further includes a valve stem extending in a direct of a longitudinal axis of the valve from the valve member, and positioned and configured to be movably supported in a guide ring formed at a lower end of the rib, wherein the valve stem, is movable vertically to move the valve member to its open and closed positions;*

*the resilient member biasing the valve stem such that the valve member remains in the open position until water pressure pushing against the valve member reaches the predetermined pressure to overcome the bias of the resilient member, and*

*the resilient member is tensioned to resist compression until the predetermined pressure is exceeded, the predetermined pressure is selected based on a relative position elevation of the sprinkler irrigation system.*

*7. A sprinkler for use in an irrigation system comprising:*

*a body;*

*a riser mounted in the body to move upward and downward therein;*

*an inlet formed in a bottom of the body configured and operable for connection to a water supply; and*

*a restriction valve positioned in the inlet and operable to move between an open position in which water is supplied to the sprinkler and a closed position in which the flow of water entering the sprinkler is restricted, the restriction valve further comprises:*

*a valve body integrated into the body of the sprinkler adjacent to the inlet and including a central opening through which water flows into the sprinkler;*

*a rib extending from the valve body in a direction of a longitudinal axis of the valve at a location beyond an inner margin of the central opening;*

*a valve member configured and operative to cooperate with the central opening to open and close the valve; and*

*a resilient member which biases the restriction valve in the open position until a predetermined pressure is applied to the restriction value to move it to the closed position and to restrict the flow of water into the sprinkler body, the predetermined pressure selected based on a relative position of the sprinkler in the irrigation system,*

*wherein the valve member further included a valve stem extending downwardly from the valve member, and positioned and configured to be movably supported in a guide ring formed at a lower end of the rib, wherein the valve stem is movable vertically to move the valve member to its open and closed positioned,*

*the resilient member biasing the valve stem such that the valve member remains in the open position until water pressure pushing against the valve member reaches the predetermined pressure to overcome the bias of the resilient member.*

* * * * *